United States Patent [19]

Morlock et al.

[11] 4,152,284
[45] May 1, 1979

[54] ACCELERATOR COMBINATION FOR THE CROSS-LINKING OF POWDER PAINTS

[75] Inventors: Gerhard Morlock; Hans-Joachim Holle, both of Hanau, Fed. Rep. of Germany

[73] Assignee: Deutsche Gold- und Silber-Scheideanstalt vormals Roessler, Frankfurt am Main, Fed. Rep. of Germany

[21] Appl. No.: 832,710

[22] Filed: Sep. 12, 1977

[30] Foreign Application Priority Data

Sep. 13, 1976 [DE] Fed. Rep. of Germany ....... 2641108

[51] Int. Cl.$^2$ .............................. C08F 4/04; C08F 4/08
[52] U.S. Cl. ................. 252/182; 252/429 R; 526/217; 526/238
[58] Field of Search .......... 252/182, 429 R; 526/217, 238

[56] References Cited

U.S. PATENT DOCUMENTS 3,032,542  5/1962  Goode ................................ 526/217
3,509,114  4/1970  Ballast .................................. 526/238

Primary Examiner—Benjamin R. Padgett
Assistant Examiner—Deborah L. Kyle
Attorney, Agent, or Firm—Beveridge, Degrandi, Kline & Lunsford

[57] ABSTRACT

An accelerator combination is provided for the cross-linking of powder paints containing an acrylic resin containing carboxyl groups and an epoxy resin at elevated temperatures, said accelerator containing, based on the weight of said acrylic resin:

(a) 0.05 to 3.0% by weight of at least one compound of the formula LiX, in which X signifies a hydroxyl ion, the anion of hydrochloric acid, hydrobromic acid, or of a saturated or unsaturated aliphatic or aromatic carboxylic acid; and (b) 0.5 to 5.0% by weight of at least one quaternary ammonium compound of the formula

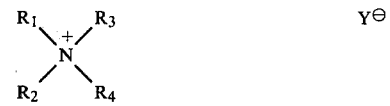

in which $R_1$ signifies a saturated aliphatic radical, $R_2$, $R_3$ and $R_4$ signify the same or different saturated aliphatic radicals, aryl radicals or aralkyl radicals, wherein two of the radicals $R_2$ to $R_4$ may be replaced by a group which together with the nitrogen atom forms a saturated heterocylic ring, or all radicals $R_2$ to $R_4$ may be replaced by a group which together with the nitrogen atom forms a pyridine ring, and in which $Y^\ominus$ signifies a monobasic inorganic or organic acid anion.

7 Claims, No Drawings

ACCELERATOR COMBINATION FOR THE CROSS-LINKING OF POWDER PAINTS

BACKGROUND OF THE INVENTION

1. Field of the Invention

The present invention relates to an accelerator combination for the cross-linking of powder paints based on an acrylic resin having carboxyl groups and of an epoxy resin at elevated temperatures.

2. Description of the Prior Art

The cross-linking powder paints on the basis of acrylic resins having carboxyl groups and of epoxy resins, especially such on the basis of "bisphenol A," at elevated temperatures generally requires the addition of an accelerator for the cross-linking reaction, since otherwise, even in the case of stoving temperatures of about 200° C., no sufficient hardening may be achieved within a tolerable time. The accelerators used customarily are, however, either not effective to the desired degree or else they lead to well cross-linked but dull surfaces of the coatings during hardening.

SUMMARY OF THE INVENTION

The present invention relates to an accelerator combination for the cross-linking of powder paints on the basis of an acrylic resin having carboxyl groups and of an epoxy resin at elevated temperatures, said accelerator consisting essentially of, always related to the weight of said acrylic resin:

(a) 0.05 to 3.0% by weight of at least one compound of the formula LiX, in which X signifies a hydroxyl ion, the anion of hydrochloric acid, hydrobromic acid, or of a saturated or unsaturated aliphatic or aromatic carboxylic acid; and (b) 0.5 to 5.0% by weight of at least one quaternary ammonium compound of the formula

in which $R_1$ signifies a saturated aliphatic radical containing 8 to 30 carbon atoms, $R_2$, $R_3$ and $R_4$ signify the same or different saturated aliphatic radicals containing 1 to 24 carbon atoms, aryl radicals containing 6 to 10 carbon atoms or aralkyl radicals containing 7 to 11 carbon atoms, whereby also two of the radicals $R_2$ to $R_4$ may be replaced by a group which together with the nitrogen atom forms a saturated heterocylic ring with 5 to 10 ring members, or else all radicals $R_2$ to $R_4$ may be replaced by a group which together with the nitrogen atom forms a pyridine ring, and in which $Y^\ominus$ signifies a monobasic inorganic or organic acid anion.

The accelerator combination of the present invention leads during stoving within a short time to a good cross-linking of the powder paint and to coatings with a perfect, highly glossy surface.

DESCRIPTION OF THE PREFERRED EMBODIMENTS

The component (a), related to the weight of the acrylic resin contained in the the powder paint, is used in quantities of 0.05 to 3.0% by weight, preferably 0.1 to 0.5% by weight. Suitable compounds of the formula LiX are, for example, lithium hydroxide, lithium chloride, lithium bromide, the lithium salts of saturated or unsaturated aliphatic carboxylic acids containing 1 to 18 carbon atoms, preferably 2 to 4 carbon atoms, such as acetic acid, propionic acid, acrylic acid, methacrylic acid, butyric acid, lauric acid, stearic acid or oleic acid, or the lithium salts of aromatic carboxylic acids containing 7 to 14 carbon atoms such as benzoic acid, methylbenzoic acid or salicylic acid. Particularly preferred compounds are the hydroxide, acetate, acrylate, methacrylate and benzoate. The use of lithium chloride is preferred very particularly.

The component (b), likewise related to the weight of the acrylic resin contained in the powder paint, is used in quantities of 0.5 to 5.0% by weight, preferably 1.0 to 2.0% by weight. Suitable compounds of the formula

are those in which $R_1$ signifies a saturated aliphatic radical with 8 to 30, preferably 12 to 24, especially 14 to 20 carbon atoms, for example, the capryryl, lauryl, palmityl, stearyl or myristyl radical. The radicals $R_2$, $R_3$ and $R_4$ may signify the same or different saturated aliphatic radicals containing 1 to 24, preferably 1 to 18 carbon atoms, for example, methyl, ethyl, propyl, butyl, lauryl, palmityl, stearyl, or myristyl radicals, aryl radicals containing 6 to 10 carbon atoms, such as the phenyl or naphthyl radicals or aralkyl radicals containing 7 to 11 carbon atoms, for example, the benzyl radical. Two of the radicals $R_2$ to $R_4$, however, may also be replaced by a group which together with the nitrogen atom forms a saturated heterocyclic ring containing 5 to 10 ring members, especially a piperidine ring. All radicals $R_2$ to $R_4$ may finally also be replaced by a group which together with the nitrogen atom forms a pyridine ring. $Y^\ominus$ signifies a monobasic inorganic acid anion, for example, a chloride, bromide, hydrogen sulfate or dihydrogen phosphate anion, or a monobasic acid anion, for example, the anion of a saturated aliphatic carboxylic acid containing 2 to 18 carbon atoms, such as acetic acid, propionic acid, butyric acid, lauric acid or stearic acid or a monoalkyl sulfate anion, such as the methyl sulfate anion, the anion of an aryl sulfonic acid, such as benzene sulfonic acid or toluene sulfonic acid or of an aromatic carboxylic acid such as benzoic acid. The use of corresponding quaternary ammonium chlorides such as myristyldimethylbenzylammonium chloride, dimethyldimyristylammonium chloride, stearyldimethylbenzylammonium chloride, dimethyldistearylammonium chloride, didecyldiethylammonium chloride, lauryltrimethylammonium chloride, trioctylmethylammonium chloride or lauryl pyridinium chloride is especially preferred.

The accelerator combination of the present invention may be worked into the powdered paint in the customary manner within the scope of a final processing step, by adding it during the mixing of the acrylic resin with the epoxy resin and possibly with pigments and other raw materials for paints. In the case of this method of mixing in of the hardening accelerator combination, the temperature of the mixture must be controlled carefully in order that no premature cross-linking reactions occur, for which purpose generally the production of at least a master-batch is necessary. Therefore, it is preferred to mix the accelerator combination only with the acrylic resin in the melt. It is particularly advantageous, however, when both components or at least component (a) are added to the monomer mixture for the production of the acrylic resin having carboxyl groups. In this way, not only an additional step in the process will be saved, but a particularly good homogenization will be achieved in the acrylic resin which very much simplifies the mixing with the epoxy resin and the packaging of the finished powder paint.

The accelerator component (b) either does not or only insufficiently accelerate by itself the cross-linking of powder paints on the basis of an acrylic resin containing carboxyl groups and of an epoxy resin at temperatures up to 200° C., which is evidenced by poor mechanical characteristics and a low chemical resistance of the stoved coating films. It is true that the accelerator component (a) does accelerate the cross-linking of the powder paint and that it results in coating films with good mechanical characteristics and with good chemical resistance. However, the accelerator component (a), even in concentrations below 0.2% by weight, related to the acrylic resin containing carboxyl groups, causes a considerable loss in gloss of the coatings. It was therefore, surprising and not predictable that with the accelerator combination of the invention, coatings with high gloss and good mechanical characteristics and good chemical resistance could be obtained.

The accelerator combination of the invention accelerates the cross-linking of all customary binders for powder paints on the basis of an acrylic resin having carboxyl groups and of an epoxy resin.

The preferred binders for powder paints contain acrylic resins with an average molecular weight (mean numbers) between about 2,000 and about 15,000, especially between about 3,000 and about 6,000. The melt viscosity index (MFI 125/2; DIN 53 735) lies between about 2 and about 50 g/10 min., especially between about 10 and about 20 g/10 min. In that case, the resins have viscosity numbers from 0.06 to 0.25 dl/g, especially from 0.08 to 0.13 dl/g—measured at 20° C., in a 1:1 mixture of dimethyl formamide and toluene. The acid number of these acrylic resins lies between about 50 and about 160, especially between about 70 and about 120. They have a glass transition temperature between about 30° and about 80° C., especially between about 35° and about 60° C.

Suitable acrylic resins can, for example, be produced by radical polymerization of a mixture consisting of:
 (A) 10 to 65% by weight, preferably 30 to 60% by weight, of methyl methacrylate.
 (B) 20 to 50% by weight, preferably 25 to 40% by weight, of at least one ester of acrylic or methacrylic acid with a monovalent alcohol, the homopolymerizate of which has a glass transition temperature under 40° C. The n-butyl acrylate and n-butyl methacrylate are used in preference. Additional examples are the ethylacrylate, 2-methoxyethylacrylate, 2-ethoxyethylacrylate, 2-methoxyethylmethacrylate, 2-ethoxyethylmethacrylate, isobutylmethacrylate, 2-ethylhexylacrylate, laurylmethacrylate, stearylmethacrylate and cyclohexylacrylate.
 (C) 5 to 20% by weight, preferably 10 to 15% by weight, of at least one $\alpha,\beta$-unsaturated carboxylic acid selected from the group of acrylic acid, methacrylic acid and itaconic acid. Methacrylic acid and acrylic acid are used in preference.
 (D) 0 to 50% by weight, preferably at most 25% by weight of additional monomers copolymerizable with components (A) to (C). Examples of such monomers are styrene, $\alpha$-methylstyrene, acrylonitrile, acrylamide, diacetoneacrylamide, ethylmethacrylate, 2-hydroxyethylmethacrylate, 2-hydroxypropylmethacrylate, 4-hydroxybutylmethacrylate, 2-hydroxyethylacrylate, 2-hydroxypropylacrylate and 4-hydroxybutylacrylate.

It will be effective to carry out the polymerization of this monomer mixture in the presence of 0.5 to 4.0% by weight, preferably of 1.5 to 3.0% by weight, of at least one chain regulator, known per se, for the vinyl polymerization. Examples of such chain regulators include the mercaptans, such as octylmercaptan, n-dodecylmercaptan and tert. dodecylmercaptan; thioglycolic acid; the esters of thioglycolic acid with a mono to quadrivalent alcohol such as butyl alcohol, hexyl alcohol, octyl alcohol, isooctyl alcohol, ethylene glycol, 1,2-propylene glycol, 1,3-propylene glycol, 1,2-butylene glycol, 1,3-butylene glycol, 1,4-butylene glycol, glycerine, trimethylolpropane, pentaerythrite or di-tri-or tetraethylene glycol.

The polymerization of the monomer mixture is advantageously carried out in bulk. This may be accomplished in one step or in several steps. It may be accomplished particularly effectively, for example, in two steps whereby in the first step a sirupy prepolymerizate with a viscosity of, for example, about 1000 cP is produced at temperatures between about 60° and about 120° C., and in the second step is stoved (hardened or cured) by bulk polymerization discontinuously in flat, individual molds or else continuously, for example, according to the process known from German As No. 1 212 301 or between two endless steel belts in layers of a few millimeters up to at most a few centimeters thickness at temperatures between about 70° and about 100° C. Thereby, care should be taken by means of an air or water bath for a sufficient removal of the heat of polymerization which is released. In some cases, a secondary hardening at about 100° to about 120° C. is advantageous. The product obtained in this way may be used after comminution directly as a component in powder paints. The production may be accomplished without difficulties but also in a suitable solvent according to known methods of solution polymerization. This process, however, has the disadvantage that the solvent must be removed again after the polymerization.

Known radical catalysts serve as polymerization catalysts, especially peroxides and azo compounds with decomposition temperatures below 100° C. Suitable catalysts are, for example, tert.-butylperpivalate, tert.-butylperisobutyrate, tert.-butylperoctoate, benzoyl peroxides, monochlorobenzoyl peroxide, dichlorobenzoyl peroxide, diacetyl peroxide, lauryl peroxide, cyclohexanone hydroperoxide, diisopropylperoxydicarbonate, cyclohexyl peroxydicarbonate, diisooctylperoxydicarbonate, acetylcyclohexyl sulfonyl peroxide, acetylisopropylsulfonyl peroxide, azobisisobutyric acid nitrile or azobis-(2,4-dimethyl) valeronitrile.

The preferred binders for powder paints contain in addition, epoxy resins with at least two epoxy groups per molecule. Suitable epoxy resins may be produced, for example, by conversion of epichlorohydrin or an equivalent epoxy compound with at least one compound of the group selected from the multivalent phenols, novo lacquer resins, polynuclear polyhydroxy phenols or polyglycols, whereby the molecular weight of the epoxy resin may be adjusted by variation of the ratio of the reation components. Moreover, glycidyl esters of the multibasic aromatic carboxylic acids, such as diglycidylterephthalate or compounds of the type of the triglycidylisocyanurates may be used. Particularly suitable are such epoxy resins which are obtainable by reaction of epichlorohydrin with 2,2-bis-(p-hydroxyphenyl)-propane ("bisphenol A") and which have an average molecular weight between 900 and 3000, an epoxy equivalent weight between 450 and 1200 and a softening point according to Durran between 60° and 110° C.

In the finished binders for powder paints, the ratio of the carboxylic groups originating from the acrylic resin, to the epoxy groups should lie between 0.5 to 2.0, preferably between 1.0 and 1.5. This will be achieved generally by the use of epoxy resins on the basis of bisphenol A, whenever 30 to 70% by weight of a suitable acrylic resin is mixed with 70 to 30% by weight of at least one epoxy resin. Possibly, additionally up to 15% by weight of at least one additional binder for paints known per se, for example, cellulose-acetobutyrate, may be mixed in, as well as other customary paint-components, such as pigments, fillers, flatting agents, flow aids, antistatic agents or surface active substances in the concentrations used customarily.

Finished stoving powdered paints are obtained by homogenizing the arcylic resin with the epoxy resin and pigments, for example, the customary titanium dioxide pigments and possibly additional paint aids, in the melt, for example, at elevated temperatures between about 90° and about 120° C. in a kneader or extruder, then cooling the melt and grinding the solid mixture into a powder of the desired particle size (mostly smaller than 90μ.)

After processing into a sprayable powder, the stoving powder paint may be applied according to the customary electrostatic powder spray methods to suitable metal surfaces and may be stoved at temperatures of 170° to 200° C. The stoved paint films show good adhesion and good mechanical characteristics even on degreased but otherwise untreated steel sheet and on other metals, and have pre-eminent resistance to chemicals as well. The very good resistance against salt water should be also stressed.

The invention is to be elucidated in more detail by the following non-limiting examples:

EXAMPLE 1

(a) Production of an acrylic resin in the presence of an accelerator combination according to the invention 2.5 parts by weight of thioglycolic acid, 0.2 parts by weight of LiCl and 2.0 parts by weight of dimethyldistearyl-ammonium chloride were dissolved while heating in a mixture consisting of 59 parts by weight of methylmethacrylate, 30 parts by weight of n-butylacrylate and 11 parts by weight of acrylic acid. The mixture was heated to 80° C. and the polymerization was triggered by the addition of 0.03 part by weight of azobisisobutyric acid nitrile. At first the reaction temperature rose to about 95° C. and then dropped slowly. After about 30 to 40 minutes, a sirupy pourable prepolymerizate had developed. After cooling to about 40° C., the latter was mixed with 0.7% by weight of 25% diacetyl peroxide solution (in dibutylphthalate) and was hardened in a polyethylene foil between metal plates in a layer of about 1 cm thickness in a water bath at 75° C. in about 1 hour. The clear polymerizate had a viscosity number (in dimethylformamide/toluene 1:1) of 0.100 dl/g.

(b) Mixing of a powdered paint 100 parts by weight of the acrylic resin produced according to (a) were mixed with 100 parts by weight of an epoxy resin on the basis of bisphenol A and epichlorohydrin with an epoxy equivalent weight of 800 to 900 and a softening point according to Durran of 94° to 104° C. and with 100 parts by weight of a very finely divided white titanium dioxide of the Rutile type (produced according to the chloride process). The powder mixture was subsequently homogenized in an extruder for 1 minute at 110° to 120° C. The melt was quenched at room temperature and was ground into a powder of a particle size below 90μ.

(c) Application of the powder paint and characteristics of the stoved paint films The powder paint was sprayed in a commercial powder spraying installation at a voltage of 60 kV on 0.88 mm thick, degreased test steel sheets and was subsequently stoved for 10 minutes at 200° C. Coatings free of bronzing with the following characteristics resulted:

| | |
|---|---|
| Cross-cut test (DIN 53 151): | 0 |
| Bend test (DIN 53 152): | 2 mm |
| Cupping test (according to Erichsen) (DIN 53 156): | above 8 mm |
| Reverse impact (according to Erichsen) (350 kg; model 223): | 4 mm |
| Gloss at 60° (Gardner): | 94 |

COMPARATIVE EXAMPLE 1

Example 1 was repeated with the sole difference that only 0.2 part by weight of LiCl was added to the mixture of monomers, but no quaternary ammonium compound. Coatings free of bronzing with the following characteristics resulted:

| | |
|---|---|
| Cross-cut test (DIN 53 151): | 0 |
| Bend test (DIN 53 152): | 2 mm |
| Cupping test (according to Erichsen) (DIN 53 156): | 8 mm |
| Reverse impact (according to Erichsen) (350 kg; model 223): | 3–4 mm |
| Gloss at 60° (Gardner): | 70 |

COMPARATIVE EXAMPLE 2

Example 1 was repeated with the sole difference that only 2.0 parts by weight of dimethyldistearyl ammonium chloride, but no lithium chloride were added to the mixture of monomers. Coatings free of bronzing and with the following characteristics resulted:

| | |
|---|---|
| Cross-cut test (DIN 53 151): | 5 |
| Bend test (DIN 53 152): | 8 mm chips off |
| Cupping test (according to Erichsen) (DIN 53 156): | 4 mm tears |
| Reverse impact (according to Erichsen) (350 kg; model 223): | chips off |
| Gloss at 60° (Gardner): | 98 |

EXAMPLE 2

(a) Production of an acrylic resin in the presence of an accelerator combination according to the invention 2.5 parts by weight of thioglycolic acid, 0.3 part by weight of LiBr and 2.0 parts by weight of myristyldimethylbenzyl ammonium chloride was dissolved while heating in a mixture consisting of 59 parts by weight of methylmethacrylate, 30 parts by weight of n-butylacrylate and 11 parts by weight of acrylic acid. The mixture was heated to 80° C. and the polymerization was triggered by the addition of 0.03 part by weight of azobisisobutyric acid nitrile. The reaction temperature at first rose to about 95° C. and then dropped slowly. After about 30 to 40 minutes, a sirupy pourable prepolymerizate had developed. This, after cooling to about 40° C. was mixed with 0.7% by weight of 25% diacetyl peroxide solution (in dibutylphthalate) and hardened in polyethylene foil between metal plates in a layer of about 1 cm thickness in a water bath at 75° C. in about 1 hour. The clear polymerizate had a viscosity number (in dimethyl formamide/toluene 1:1) of 0.100 dl/g.

(b) Mixing of a powder paint 100 parts by weight of the acrylic resin produced according to (a) were mixed with 100 parts by weight of an epoxy resin on the basis of bisphenol A and epichlorohydrin with an epoxy equivalent weight of 800 to 900 and a softening point according to Durran of 94° to 104° C. and with 100 parts by weight of very finely divided white titanium dioxide of the Rutile type (produced according to the chloride process). The powder mixture was subsequently homogenized for 1 minute in an extruder at 110° to 120° C. The melt was quenched to ambient temperature and was ground into a powder of a particle site below 90μ.

(c) Application of the powder paint and characteristics of the stoved paint films The powder paint was sprayed in a commercial powder spray installation at a voltage of 60 kV onto 0.88 mm thick degreased steel test sheets and was stoved subsequently for 10 minutes at 200° C. Coatings free of bronzing and with the following characteristics resulted:

| | |
|---|---|
| Cross-cut test (DIN 53 151): | 0 |
| Bend test (DIN 53 152): | 2 mm |
| Cupping test (according to Erichsen) (DIN 53 156): | above 8 mm |
| Reverse impact (according to Erichsen) (350 kg; model 223): | 4 mm |
| Gloss at 60° (Gardner): | 92 |

COMPARATIVE EXAMPLE 3

Example 2 was repeated with the sole difference that only 0.3 part by weight of LiBr, but no quaternary ammonium compound was added to the mixture of monomers. Coatings free of bronzing and with the following characteristics resulted:

| | |
|---|---|
| Cross-cut test (DIN 53 151): | 0 |
| Bend test (DIN 53 152): | 2 mm |
| Cupping test (according to Erichsen) (DIN 53 156): | 7 mm |
| Reverse impact (according to Erichsen) (350 kg; model 223): | 3 mm |
| Gloss at 60° (Gardner): | 72 |

COMPARATIVE EXAMPLE 4

Example 2 was repeated with the sole difference that only 2.0 parts by weight of myristyldimethylbenzyl ammonium chloride but no lithium bromide was added to the mixture of monomers. Coatings free of bronzing with the following characteristics resulted:

| | |
|---|---|
| Cross-cut test (DIN 53 151): | 5 |
| Bend test (DIN 53 152): | 8 mm |
| | chips off |
| Cupping test (according to Erichsen) (DIN 53 156): | 4 mm tears |
| Reverse impact (according to Erichsen) (350 kg; model 223): | chips off |
| Gloss at 60° (Gardner): | 94 |

EXAMPLE 3

(a) Production of an acrylic resin in the presence of an accelerator combination according to the invention 2.5 parts by weight of thioglycolic acid, 1.2 parts by weight of lithium benzoate and 2.0 parts by weight of dilauryldimethyl ammonium-p-toluene sulfonate were dissolved while heating in a mixture consisting of 59 parts by weight of methylmethacrylate, 30 parts by weight of n-butyl acrylate and 11 parts by weight of acrylic acid. The mixture was heated to 80° C. and the polymerization was triggered by the addition of 0.03 part by weight of azobisisobutyric acid nitrile. At first the reaction temperature rose to about 95° C. and then dropped slowly. After about 30 to 40 minutes, a sirupy, pourable prepolymerizate had developed. After cooling to about 40° C., this was mixed with 0.7% by weight of 25% diacetyl peroxide solution (in dibutylphthalate) and was hardened in about 1 hour in polyethylene foil between metal plates in a layer of about 1 cm thickness in a water bath at 75° C. The clear polymerizate had a viscosity number (in dimethylformamide/toluene 1:1) of 0.109 dl/g.

(b) Mixing of a powder paint 100 parts by weight of the acrylic resin produced according to (a) were mixed with 100 parts by weight of an epoxy resin on the basis of bisphenol A and epichlorohydrin with an epoxy equivalent weight of 800 to 900 and a softening point according to Durran of 94° to 104° C. and with 100 parts by weight of a very finely divided white titanium dioxide of the Rutile type (produced according to the chloride process). The powder mixture was homogenized subsequently for about 1 minute at 110° to 120° C. in the extruder. The melt was quenched to ambient temperature and was ground into a powder of a particle size below 90μ.

(c) Application of the powdered paint and characteristics of the stoved paint films The powder paint was sprayed in a commercial powder spray installation at a voltage of 60 kV onto 0.88 mm thick degreased steel test sheets and was subsequently stoved for 10 minutes at 200° C. Coatings free of bronzing with the following characteristics resulted:

| Cross-cut test | | |
|---|---|---|
| (DIN 53 151): | | 0 |
| Bend test | | |
| (DIN 53 152): | | 2 mm |
| Cupping test (according to Erichsen) | | |
| (DIN 53 156): | above | 8 mm |
| Reverse impact (according to Erichsen) | | |
| (350 kg; model 223): | | 4 mm |
| Gloss at 60° (Gardner): | | 88 |

COMPARATIVE EXAMPLE 5

Example 3 was repeated with the sole difference that only 1.2 parts by weight of lithium benzoate, but no quaternary ammonium compound was added to the mixture of monomers. Coatings free of bronzing and with the following characteristics resulted:

| Cross-cut test | | |
|---|---|---|
| (DIN 53 151): | | 0 |
| Bend test | | |
| (DIN 53 152): | | 2 mm |
| Cupping test (according to Erichsen) | | |
| (DIN 53 156): | above) | 8 mm |
| Reverse impact (according to Erichsen) | | |
| (350 kg; model 223): | | 4 mm |
| Gloss at 60° (Gardner): | | 68 |

EXAMPLE 4

(a) Production of an acrylic resin in the presence of an accelerator combination according to the invention 2.5 parts by weight of thioglycolic acid, 0.2 part by weight of LiOH and 2.5 parts by weight of trimethylstearylammonium stearate were dissolved while heating in a mixture consisting of 59 parts by weight of methylmethacrylate, 30 parts by weight of n-butyl acrylate and 11 parts by weight of acrylic acid. The mixture was heated to 80° C., and the polymerization was triggered by the addition of 0.03 part by weight of azobisisobutyric acid nitrile. The reaction temperature at first rose to about 95° C. and then dropped slowly. After about 30 to 40 minutes, a sirupy, pourable prepolymerizate had developed. This is mixed after cooling to about 40° C. with 0.7% by weight of 25% diacetylperoxide solution (in dibutylphthalate) and was hardened in polyethylene foil between metal plates in a layer of about 1 cm thickness in a water bath at 75° C. in about 1 hour. The clear polymerizate had a viscosity number (in dimethylformamide/toluene 1:1) of 0.102 dl/g.

(b) Mixing of a powder paint 100 parts by weight of the acrylic resin produced according to (a) were mixed with 100 parts by weight of an epoxy resin on the basis of bisphenol A and epichlorohydrin with an epoxy equivalent weight of 800 to 900 and with a softening point according to Durran of 94° to 104° C. and with 100 parts by weight of very finely divided and dispersed white titanium dioxide of the Rutile type (produced according to the chloride process). The powder mixture was subsequently homogenized for about 1 minute in an extruder at 110° to 120° C. The melt was quenched to ambient temperature and was ground into a powder of a particle size below 90 μ.

(c) Application of the powdered paint and characteristics of the stoved paint films The powder paint was sprayed in a commercial powder spraying installation at a voltage of 60 kV onto 0.88 mm thick, degreased steel test sheets and was subsequently stoved for 10 minutes at 200° C. Coatings free of bronzing and with the following characteristics resulted:

| Cross-cut test | | |
|---|---|---|
| (DIN 53 151): | | 0 |
| Bend test | | |
| (DIN 53 152): | | 2 mm |
| Cupping test (according to Erichsen) | | |
| (DIN 53 156): | above | 8 mm |
| Reverse impact (according to Erichsen) | | |
| (350 kg; model 223): | | 4 mm |
| Gloss at 60° (Gardner): | | 86 |

COMPARATIVE EXAMPLE 6

Example 4 was repeated with the sole difference that only 0.2 part by weight of LiOh but no quaternary ammonium compound was added to the monomer mixture. Coatings free of bronzing with the following characteristics resulted:

| Cross-cut test | |
|---|---|
| (DIN 53 151): | 0 |
| Bend test | |
| (DIN 53 152): | 2 mm |
| Cupping test (according to Erichsen) | |
| (DIN 53 156): | 8 mm |
| Reverse impact (according to Erichsen) | |
| (350 kg; model 223): | 3-4 mm |
| Gloss at 60° C. (Gardner): | 67 |

EXAMPLE 5

(a) Production of an acrylic resin in the presence of an accelerator combination according to the invention 2.5 parts by weight of thioglycolic acid, 0.2 part by weight of LiCl and 2.0 parts by weight of laurylpyridiniumbisulfate were dissolved while heating in a mixture consisting of 59 parts by weight of methylmethacrylate, 30 parts by weight of n-butyl acrylate and 11 parts by weight of acrylic acid. The mixture was heated to 80° C. and the polymerization was triggered by the addition of 0.03 part by weight of azobisisobutyric acid nitrile. At first the reaction temperature rose to about 95° C. and then dropped slowly. After about 30 to 40 minutes, a sirupy, pourable prepolymerizate had developed. This was mixed after cooling to about 40° C. with 0.7% by weight of 25% of diacetyl peroxide solution (in dibutylphthalate) and was hardened in polyethylene foil between metal-plates in a layer of about 1 cm thickness in a water bath at 75° C. in about 1 hour. The clear polymerizate had a viscosity number (in dimethyl formamide/toluene 1:1) of 0.111 dl/g.

(b) Mixing of a powder paint 100 parts by weight of the acrylic resin produced according to (a) were mixed with 80 parts by weight of an epoxy resin on the basis of bisphenol A and epichlorohydrin with an epoxy equivalent weight of 1000 to 1100 and a softening point according to Durran of 100° to 110° C. and with 20 parts by weight of an epoxy resin on the basis of bisphenol A and epichlorohydrin with an epoxy equivalent weight of 450 to 500 and a softening point according to Durran of 60° to 70° C. and with 100 parts by weight of very finely divided and dispersed white titanium dioxide of the Rutile type (produced according to the chloride process). The powder mixture was subsequently homogenized for 1 minute in an extruder at 110° to 120° C. The melt was quenched to ambient temperature and was ground into a powder of particle size below 90μ.

(c) Application of the powder paint and characteristics of the stoved paint films The powder paint was sprayed in a commercial powder spraying installation at a voltage of 60 kV onto 0.88 mm thick degreased steel test sheets and was subsequently stoved for 10 minutes at 200° C. Coatings free of yellow with the bronzing characteristics resulted:

| | |
|---|---|
| Cross-cut test (DIN 53 151): | 0-1 |
| Bend test (DIN 53 152): | 3 mm |
| Cupping test (according to Erichsen) (DIN 53 156): | 7-8 mm |
| Reverse impact (according to Erichsen) (350 kg; model 223): | 3 mm |
| Gloss at 60° (Gardner): | 89 |

EXAMPLE 6

Production of an acrylic resin in the presence of an accelerator combination according to the invention 2.5 parts by weight of glycol dimercapto acetate, 0.1 part by weight of LiCl and 1.0 part by weight of dimethyl distearyl ammonium chloride are dissolved while heating in a mixture consisting of 34 parts by weight of methylmethacrylate, 18.5 parts by weight of n-butyl methacrylate, 30 parts by weight of n-butyl acrylate, 7.5 parts by weight of hydroxypropyl methacrylate and 10 parts by weight of methacrylic acid. The mixture was heated to 80° C. and the polymerization was triggered by the addition of 0.03 part by weight of azobisisobutyric acid nitrile. The reaction temperature at first rose to about 98° C. and then dropped slowly. After about 30 to 40 minutes, a sirupy, pourable prepolymerizate had developed. After cooling to about 40° C., this was mixed with 1.0% by weight of 25% diacetyl peroxide solution (in dibutylphthalate) and was hardened in a polyethylene foil between metal plates in a layer of about 1 cm thickness in a water bath of 75° C. in about 1 hour. The clear polymerizate had a viscosity number (in dimethylformamide/toluene 1:1) of 0.115 dl/g.

(b) Mixing of a powder paint 100 parts by weight of the acrylic resin produced according to (a) were mixed with 8 parts by weight of triglycidylisocyanurate and with 30 parts by weight of very finely divided and dispersed white titanium dioxide of the Rutile type (produced according to the chloride process). The powder mixture was subsequently homogenized for 20 seconds at 110° to 120° C. in an extruder. The melt was quenched to ambient temperature and was ground into a powder of a particle size below 90μ.

(c) Application of the powder paint and characteristics of the stoved paint films The powder paint was sprayed in a commercial powder spraying installation at a voltage of 60 kV onto 0.88 mm thick, degreased steel test sheets and was stoved subsequently for 10 minutes at 200° C. Coatings free of bronzing with the following characteristics resulted:

| | |
|---|---|
| Cross-cut test (DIN 53 151): | 0 |
| Bend test (DIN 53 152): | 4 mm |
| Cupping test (according to Erichsen) (DIN 53 156): | 6-7 mm |
| Reverse impact (according to Erichsen) (350 kg; model 223): | 3 mm |
| Gloss at 60° C. (Gardner): | 96 |

EXAMPLE 7

(a) Production of an acrylic resin and subsequent working in of an accelerating combination according to the invention 2.5 parts by weight of thioglycolic acid while being heated were dissolved in a mixture of 53 parts by weight of methylmethacrylate, 34 parts by weight of n-butyl acrylate and 13 parts by weight of acrylic acid. The mixture was heated to 80° C. and the polymerization was triggered by the addition of 0.03 part by weight of azobisisobutyric acid nitrile. At first the reaction temperature rose to about 93° C. and then dropped slowly. After about 30 to 40 minutes, a sirupy, pourable prepolymerizate had developed. After cooling to about 40° C., this was mixed with 0.7% by weight of 25% by weight of diacetyl peroxide solution (in dibutylphthalate) and was hardened in a polyethylene foil between metal plates in a layer of about 1 cm thickness in a water bath at 75° C. in about 1 hour. The clear polymerizate had a viscosity number (in dimethylformamide/toluene 1:1) of 0.098 dl/g.

100 parts by weight of the polymerizate ground to a grain fineness below 1 mm were mixed with 0.2 part by weight of LiCl of a grain fineness below 200μ and 2.0 parts by weight of myristyldimethylbenzylammonium chloride. The powder mixture was homogenized subsequently for 1 minute at about 120° C. in an extruder. The melt was quenched to ambient temperature and was ground into a powder of a particle size below 1 mm.

(b) Mixing of a powder paint 100 parts by weight of the acrylic resin produced according to (a) were mixed with 100 parts by weight of an epoxy resin on the basis of bisphenol A and epichlorohydrin with an epoxy equivalent weight of 800 to 900 and a softening point according to Durran of 94° to 104° C. and with 100 parts by weight of very finely divided and dispersed white titanium dioxide of the Rutile type (produced according to the chloride process). The powder mixture was subsequently homogenized for 1 minute at 110° to 120° C. in an extruder. The melt was quenched to ambient temperature and ground into a powder of a particle size below 90μ.

(c) Application of the powder paint and characteristics of the stoved paint films The powder paint was sprayed in a commercial powder spraying installation at a voltage of 60 kV onto 0.88 mm thick, degreased steel test sheets and was subsequently stoved for 10 minutes at 200° C. Coatings free of bronzing with the following characteristics resulted:

| | |
|---|---|
| Cross-cut test (DIN 53 151): | 0 |
| Bend test | |

-continued

| | |
|---|---|
| (DIN 53 152): | 3 mm |
| Cupping test (according to Erichsen) (DIN 53 156): | 7–8 mm |
| Reverse impact (according to Erichsen) (350 kg; model 223): | 4 mm |
| Gloss at 60° (Gardner): | 86 |

COMPARATIVE EXAMPLE 7

Example 7 was repeated with the sole difference that only 0.2 part by weight of LiCl (grain fineness below 200μ) but no quaternary ammonium compound was added to the polymerizate. Coatings free of bronzing with the following characteristics resulted:

| | |
|---|---|
| Cross-cut test (DIN 53 151): | 0–1 |
| Bend test (DIN 53 152): | 3 mm |
| Cupping test (according to Erichsen) (DIN 53 156): | 7 mm |
| Reverse impact (according to Erichsen) (350 kg; model 223): | 3 mm |
| Gloss at 60° C. (Gardner): | 65 |

COMPARATIVE EXAMPLE 8

Example 7 was repeated with the sole difference that only 2.0 parts by weight of myristyldimethylbenzylammonium chloride, but no lithium chloride was added to the polymerizate. Coatings free of bronzing and with the following characteristics resulted:

| | |
|---|---|
| Cross-cut test (DIN 53 151): | 5 |
| Bend test (DIN 53 152): | 8 mm chips off |
| Cupping test (according to Erichsen) (DIN 53 156): | 4 mm tears |
| Reverse impact (according to Erichsen) (350 kg; model 223): | chips off |
| Gloss at 60° (Gardner): | 98 |

EXAMPLE 8

(a) Production of an acrylic resin in the presence of an accelerating combination according to the invention 55 parts by weight of methyl methacrylate, 34 parts by weight of n-butyl acrylate and 13 parts by weight of methacrylic acid together with 2 parts by weight of thioglycolic acid, 0.2 part by weight of LiCl and 2.0 parts by weight of dimethyldistearylammonium chloride were dissolved in 50 parts by weight of isopropanol.

In a suitable reaction vessel at 85° C., 0.3 part by weight of AIBN, dissolved in an additional 50 parts by weight of isopropanol, were added to this mixture in doses within 60 minutes. After that, one part by weight of 25% diacetyl peroxide solution (in dibutylphthalate) was added and the solution was stirred for another 2 hours at 85° C. After distilling off the solvent, a clear, solid resin with a viscosity number (in dimethylformamide/toluene 1:1) of 0.09 dl/g was obtained.

(b) Mixing of a powder paint 100 parts by weight of the acrylic resin produced according to (a) were mixed with 100 parts by weight of an epoxy resin on the basis of bisphenol A and epichlorohydrin with an epoxy equivalent weight of 800 to 900 and a softening point according to Durran of 94° to 104° C. and with 100 parts by weight of a very finely divided and dispersed white titanium dioxide of the Rutile type (produced according to the chloride process). The powder mixture was subsequently homogenized in an extruder for 1 minute at 110° to 120° C. The melt was quenched to ambient temperature and was ground into a powder of a particle size below 90μ.

(c) Application of the powder paint and characteristics of the stoved paint films The powder paint was sprayed in a commercial powder spraying installation at a voltage of 60 kV onto 0.88 mm thick, degreased steel test sheets and was subsequently stoved for 10 minutes at 200° C. Coatings of bronzing with the following characteristics resulted:

| | | |
|---|---|---|
| Cross-cut test (DIN 53 151): | | 0 |
| Bend test (DIN 53 152): | | 2 mm |
| Cupping test (according to Erichsen) (DIN 53 156): | above | 8 mm |
| Reverse impact (according to Erichsen) (350 kg; model 223): | | 4 mm |
| Gloss at 60° (Gardner): | | 94 |

COMPARATIVE EXAMPLE 9

Example 8 was repeated with the sole difference that only 0.2 part by weight of LiCl, but no quaternary ammonium compound, was added to the monomer mixture. Coatings free of bronzing with the following characteristics resulted:

| | |
|---|---|
| Cross-cut test (DIN 53 151): | 0 |
| Bend test (DIN 53 152): | 2–3 mm |
| Cupping test (according to Erichsen) (DIN 53 156): | 7–8 mm |
| Reverse impact (according to Erichsen) (350 kg; model 223): | 3–4 mm |
| Gloss at 60° (Gardner): | 70 |

COMPARATIVE EXAMPLE 10

Example 8 was repeated with the sole difference that only 2.0 parts by weight of dimethyl distearyl ammonium chloride, but no lithium chloride, were added to the monomer mixture. Coatings free of bronzing with the following characteristics resulted:

| | |
|---|---|
| Cross-cut test (DIN 53 151): | 5 |
| Bend test (DIN 53 152): | 8 mm chips off |
| Cupping test (according to Erichsen) (DIN 53 156): | 4 mm tears |
| Reverse impact (according to Erichsen) (350 kg; model 223): | chips off |
| Gloss at 60° (Gardner): | 98 |

What is claimed is:

1. An accelerator combination for the cross-linking of powder paint resins containing an acrylic resin having carboxylic groups and an epoxy resin at elevated temperatures, said accelerator consisting essentially of, always related to the weight of the acrylic resin contained in the powder paint (a) 0.05 to 3.0% by weight of at least one compound of the formula LiX, in which X signifies a hydroxyl ion, the anion of hydrochloric acid, hydrobromic acid, or of a saturated or unsaturated aliphatic or aromatic carboxylic acid; and (b) 0.5 to 5.0% by weight of at least one quaternary ammonium compound of the formula

in which $R_1$ signifies a saturated aliphatic radical containing 8 to 30 carbon atoms, $R_2$, $R_3$ and $R_4$ signify the same or different saturated aliphatic radicals containing 1 to 24 carbon atoms, aryl radicals containing 6 to 10 carbon atoms or aralkyl radicals containing 7 to 11 carbon atoms, wherein two of the radicals $R_2$ to $R_4$ may be replaced by a group which together with the nitrogen atom forms a saturated heterocyclic ring with 5 to 10 ring members, or all radicals $R_2$ to $R_4$ may be replaced by a group which together with the nitrogen atom forms a pyridine ring and in which $Y^\ominus$ signifies a monobasic inorganic or organic acid anion.

2. An accelerator combination according to claim 1 consisting essentially of 0.1 to 0.5% by weight of component (a) and 1.0 to 2.0% by weight of component (b).

3. An accelerator combination according to claim 2 wherein said component (a) is lithium chloride.

4. An accelerator combination according to claim 3 wherein said component (b) is a quaternary ammonium chloride.

5. An accelerator combination according to claim 2 wherein said component (b) is a quaternary ammonium chloride.

6. An accelerator combination according to claim 1 wherein said component (a) is lithium chloride.

7. An accelerator combination according to claim 1 wherein said component (b) is a quaternary ammonium chloride.

* * * * *